UNITED STATES PATENT OFFICE.

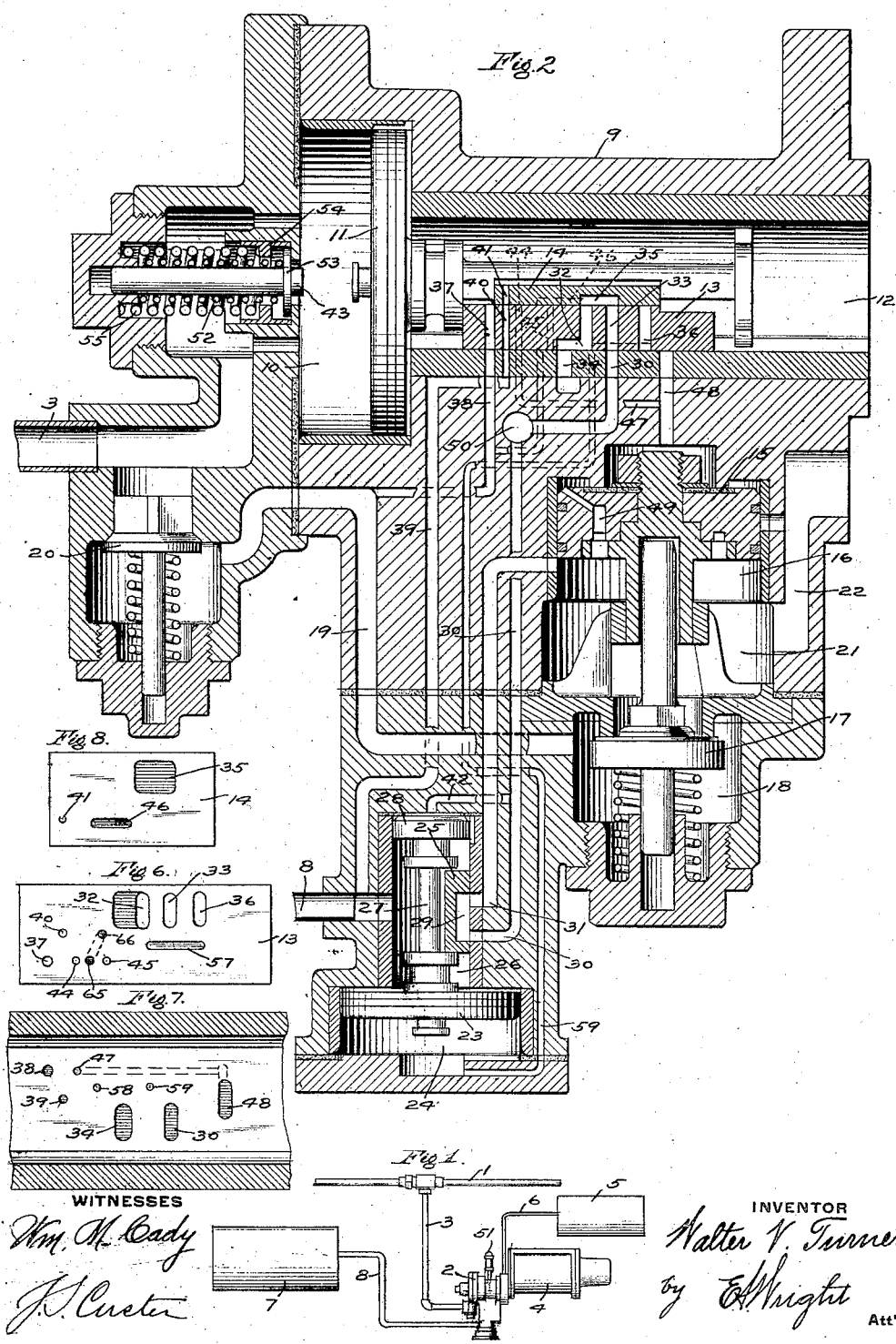

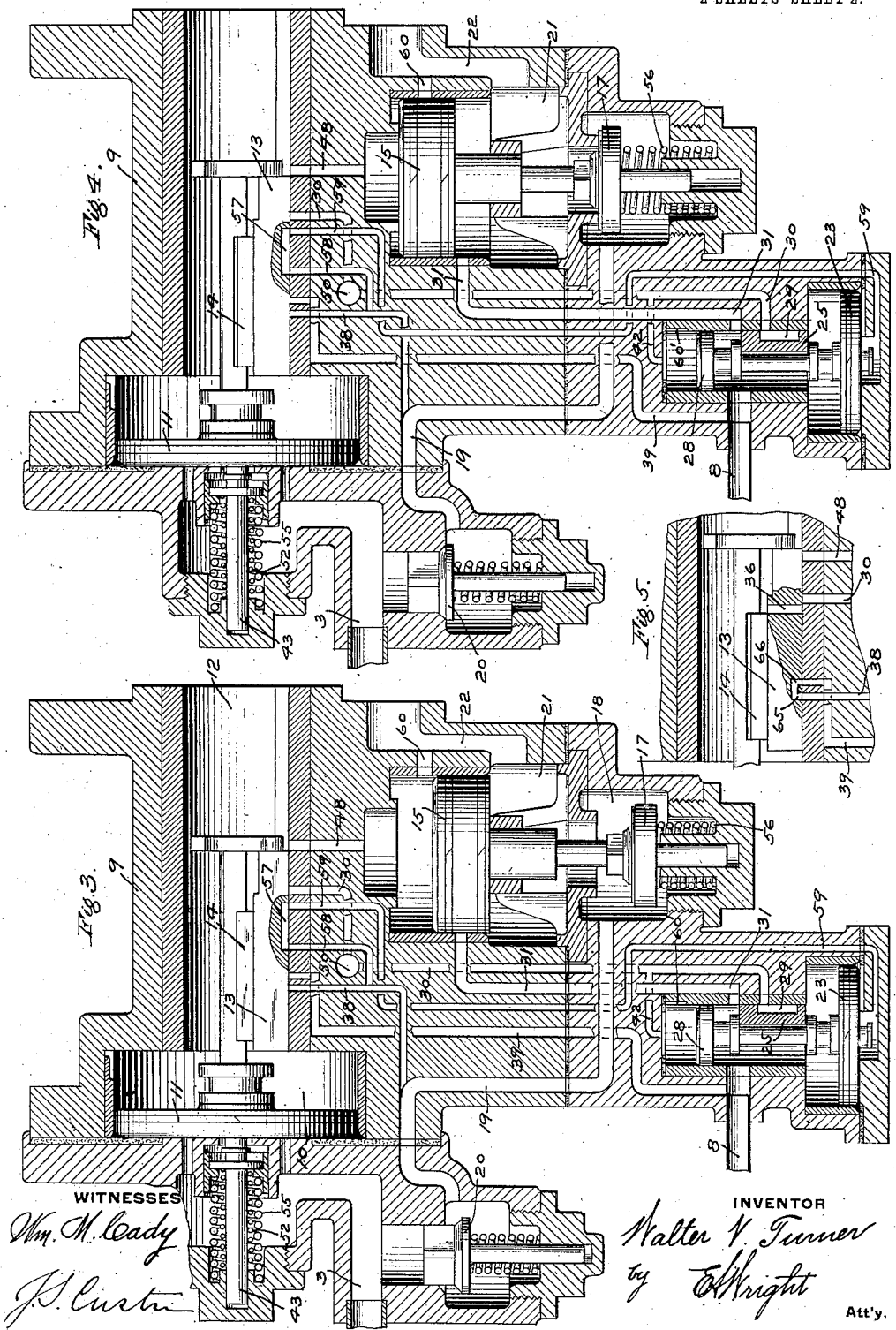

WALTER V. TURNER, OF EDGEWOOD, PENNSYLVANIA, ASSIGNOR TO THE WESTINGHOUSE AIR BRAKE COMPANY, OF PITTSBURGH, PENNSYLVANIA, A CORPORATION OF PENNSYLVANIA.

TRIPLE-VALVE DEVICE.

1,111,777.  Specification of Letters Patent.  Patented Sept. 29, 1914.

Application filed October 17, 1908. Serial No. 458,270.

*To all whom it may concern:*

Be it known that I, WALTER V. TURNER, a citizen of the United States, residing at Edgewood, in the county of Allegheny and State of Pennsylvania, have invented new and useful Improvements in Triple-Valve Devices, of which the following is a specification.

This invention relates to fluid pressure brakes and has for its principal object to provide a triple valve device having means for securing quick serial action of the triple valves throughout the train and a high degree of pressure in the brake-cylinder in an emergency application of the brakes, and is in the nature of an improvement on the construction covered in my prior application, Serial No. 408,258, filed December 27, 1907.

In the accompanying drawings; Figure 1 is a diagrammatic view of a car air brake equipment, with my improvements applied thereto; Fig. 2 a central sectional view of a triple valve device embodying my invention and showing the parts in full release position; Fig. 3 a similar view showing the parts in emergency application position, with the emergency piston in position for permitting air to flow from the auxiliary reservoir to the brake cylinde; Fig. 4 a similar view of the parts in emergency position, but showing the emergency piston in position closing the auxiliary reservoir communication and with communication open from the suppemental reservoir to the brake cylinder: Fig. 5 a fragmentary sectional view showing the main slide valve and auxiliary valve in a position in which the preliminary piston spring is compressed; Fig. 6 a face view of the main slide valve, showing the relative location of its various ports; Fig. 7 a plan view of the seat for the main slide valve, showing the arrangement of ports therein; and Fig. 8 a face view or the auxiliary valve which is mounted on the main slide valve.

A car air brake equipment with my improvements applied is shown in Fig. 1 of the drawings and comprises a brake pipe 1 connected to the triple valve device 2 by a branch pipe 3, brake cylinder 4, auxiliary reservoir 5, connected to triple valve device 2 by pipe 6, and supplemental reservoir 7, connected by pipe 8 to the triple valve device.

The triple valve device may comprise a casing 9 having piston chamber 10 containing triple valve piston 11 and communicating with branch pipe 3, valve chamber 12 open to the auxiliary reservoir and containing main slide valve 13 and auxiliary or graduating valve 14 mounted on and having a movement relative to said main slide valve.

The emergency valve mechanism preferably comprises a movable abutment 15 contained in piston chamber 16 and adapted to control a brake pipe vent valve 17 contained in valve chamber 18.

The local brake pipe vent passage 19, containing the usual non-return check valve 20, opens into the valve chamber 18, and valve 17 controls communication from said chamber to chamber 21 into which brake cylinder passage 22 opens.

I also provide in the triple valve casing a valve device comprising a movable abutment 23 contained in a piston chamber 24 and adapted to actuate a slide valve 25 contained in valve chamber 26. The end of the piston stem 27 opposite the abutment 23 is provided with a piston head 28 adapted in the inner position of the parts to seat and cut off communication from the valve chamber 26 around said head.

The valve chamber 26 is connected by pipe 8 to the supplemental reservoir 7 or other source of fluid pressure and slide valve 25 is provided with a cavity 29 adapted when the parts are in their inner position to connect a passage 30 leading to the seat of the main slide valve 13 with a passage 31 leading to the chamber 21.

The main slide valve is provided with through ports 32 and 33 adapted in normal full release position to register respectively with exhaust port 34 and port 30, ports 32 and 33 being then connected by a cavity 35 in the auxiliary valve 14; and through service port 36, controlled by the auxiliary valve 14 and adapted to register with port 30 in service application position.

Fluid under pressure being supplied to the brake pipe in the usual manner flows into the piston chamber 10 and through the feed groove around triple piston 11 to valve chamber 12 and the auxiliary reservoir charging same to the standard pressure carried in the system. In the full release position, a through port 37 in main slide valve 13 registers with a passage 38 opening into brake pipe vent passage 19 and serves the purpose of quickly charging the auxiliary reservoir from the brake pipe. A passage 39 communicating with the supplemental reservoir pipe 8, leads to the seat of the main slide valve and registers with a through port 40, which in turn registers with port 41 in the auxiliary valve 14. In this manner means are provided for charging the supplemental reservoir through the valve chamber 12.

A passage 42 opens to the space at the outer face of piston head 28 and leads to passage 30, which is open to the exhaust port 34, and, consequently, the fluid pressures equalizing on the abutment 23, the pressure on the outer face of abutment 23 exceeds the total effective pressure acting in the opposite direction, due to the head 28 being at atmospheric pressure and the parts are maintained in their inner position, as shown in Fig. 2. The brake cylinder is open to the exhaust by way of chamber 21, passage 31, cavity 29 in slide valve 25, passage 30, port 33, cavity 35 in the graduating valve 14 and port 32 which registers with exhaust port 34.

In order to make a service application of the brakes, the brake pipe pressure is reduced and the triple piston is thereupon moved out by the higher auxiliary reservoir pressure to engage the graduating stem 43 in the usual manner, first actuating the auxiliary valve 14 relatively to main slide valve 13 so as to close ports 37 and 40, and also ports 32 and 33, and uncover service port 36. The main slide valve then moves out and service port 36 registers with passage 30, so that fluid from the auxiliary reservoir is supplied to the brake cylinder through passage 30, cavity 29, passage 31, chamber 21 and brake cylinder passage 22.

In order to secure quick serial action in service applications I may provide through ports 44 and 45 in the main slide valve and a cavity 46 in the auxiliary valve 14 adapted to connect the ports 44 and 45 upon the preliminary outward movement of said auxiliary valve, the ports being adapted in the service position of the main slide valve to register respectively with passage 38 opening into the brake pipe vent passage and passage 47 leading to passage 48, which communicates with the space above the abutment 15.

A through passage 49 is provided in abutment 15, so that in service position a communication is open from the brake pipe through passage 38, port 44, cavity 46, port 45, passage 47 and passage 48 to the chamber above the abutment 15, and thence by passage 49 to chamber 21 and the brake cylinder. A local venting of the brake pipe is thus secured in service applications to produce the well known quick serial action of the triple valves throughout the train. A branch passage 50 leads from the passage 30 to a safety or reducing valve 51, and as this passage 30 is in constant open communication with the brake cylinder in service applications, the pressure therein may be limited to the desired predetermined degree. Upon sufficient flow of fluid from the auxiliary reservoir to the brake cylinder to equalize the auxiliary reservoir and brake pipe pressure acting on triple piston 11, the piston moves the graduating valve to close the service port 36 and the quick service vent ports, and as well understood, the brake cylinder pressure may be increased by further reducing the brake pipe pressure as desired, or the brakes may be released by increasing the brake pipe pressure so as to shift the parts to full release position, in which the brake cylinder is connected with the exhaust port 34 and the reservoirs are recharged to normal standard pressure. Upon a sudden reduction in brake pipe pressure the triple piston is shifted to its extreme outer position as shown in Figs. 3 and 4 in which the main slide valve 13 uncovers port 48 thus admitting fluid from the auxiliary reservoir to the emergency piston 15. Said piston is thereupon shifted outwardly opening the brake pipe vent valve 17 so as to locally vent the brake pipe to the brake cylinder and thus produce quick serial action of the triple valves, and a port 60, normally closed by the piston is uncovered so that the fluid from the auxiliary reservoir may flow into the brake cylinder, as shown in Fig. 3. Flow of air continues until the auxiliary reservoir pressure has substantially equalized into the brake cylinder. The spring 56 acting on the brake pipe vent valve 17 then returns the emergency valve parts to their inner position, closing the auxiliary reservoir port 60. The piston 15 is now in position uncovering passage 31.

In the emergency position of the main slide valve a cavity 57 therein connects a branch passage 58 opening into the brake pipe vent passage 19 with a passage 59 which leads to the chamber at the outer face of abutment 23. Air is thus vented from said chamber to the brake cylinder through the open vent valve 17 and consequently the higher pressure on the opposite side of abutment 23 starts the same outward. A slight lost motion is provided between the slide valve 25 and the abutment 23, so that the abutment readily responds to a reduction in pressure on its outer face and by providing a groove 60' around the head 28, it will be seen that as soon as the head 28 leaves its seat, the fluid under pressure from the valve chamber immediately equalizes into the space at the inner face of the head and with this increase in pressure the prompt and positive movement of the abutment 23 and valve 25 to their extreme outer position is assured. In this outer position, the slide valve 25 uncovers passage 31, so that fluid from the supplemental reservoir 7 or other source of fluid pressure may now flow to chamber 21 and thence to the brake cylinder, as shown in Fig. 4 of the drawings.

It will thus be seen that by reason of the communication to the auxiliary reservoir being closed the supplementary reservoir equalizes only into the brake cylinder and thereby a much higher pressure is obtained in the brake cylinder than would otherwise be the case. The passage 30 being closed by the movement of the slide valve 25, the safety valve is cut off from the brake cylinder and the high brake cylinder pressure is consequently retained during the emergency application.

To release the brakes after an emergency application, the brake pipe pressure is increased and the triple piston is thereby shifted to release position and passage 30 is connected to exhaust port 34. Air is thereupon released from the chamber at the inner face of piston head 28 through branch passage 42 and as the pressures at the outer face of abutment 23 will then exceed the effective pressure acting on the opposite face thereof, the abutment 23 and valve 25 are shifted to their inner position, in which the cavity 29 connects the passages 30 and 31. The fluid in the brake cylinder is thereupon released as will be evident, and the parts are again charged to normal standard pressure in the manner hereinbefore described.

If a full service application of the brakes is made, and the auxiliary reservoir pressure equalizes into the brake cylinder, further reductions in brake pipe pressure will cause the triple piston to assume the emergency position and should the pressure in the brake pipe vent passage be reduced by leakage or otherwise, there is a possibility that the connection of the passage 59 leading to the outer face of abutment 23 with passage 58 leading to the brake pipe vent passage 19, which connection is made by cavity 57 in emergency position, will cause a sufficient reduction in pressure in the chamber at the outer face of said abutment so that the same may be shifted and open the port 31. Air would then be admitted to the brake cylinder from the supplemental reservoir and an undesired high pressure would be obtained in the brake cylinder. In order to provide against this possibility, a cavity is arranged in the main slide valve having port openings 65 and 66 adapted to register respectively with passages 38 and 39 at a position intermediate service and emergency positions. By this means fluid from the supplemental reservoir is supplied to the brake pipe vent passage 19 to valve chamber 18, so that when the parts finally assume the emergency position, the pressure at the outer face of abutment 23 is not reduced and consequently the abutment and valve are not shifted.

In addition to the above I preferably provide a preliminary spring 52 adapted to be compressed on the first movement of the stem 43 by the piston 11. In the position in which air is admitted to the vent passage from the supplemental reservoir, a collar 53 on stem 43 is adapted to engage a spring stop 54 of a second and heavier spring 55, so that the parts are momentarily held in this position to insure the full charging of the vent passage and chamber 18 to the pressure in the supplemental reservoir. The triple piston then moves to final emergency position against the resistance of both springs 52 and 55, but as before stated, the opening of communication between passage 59 and vent passage 19 has no effect on the abutment 23.

An emergency valve mechanism is thus provided which is adapted to act positively in an emergency application of the brakes and in which liability to accidental operation in service application is avoided.

It will be understood that the improved triple valve device is not limited to supplying air directly to the brake cylinder but that the same may be employed to control the pressure in any chamber, whether the brake cylinder or other chamber, a variation in pressure in which is adapted to effect an application of the brakes.

Having now described my invention, what I claim as new and desire to secure by Letters Patent, is:—

1. In a triple valve device, a piston subject to the opposing pressures of the auxiliary reservoir and brake pipe, valve means operated thereby for controlling a passage leading to the brake cylinder, a valve device normally subject on opposite sides to fluid pressure only for controlling communication through said passage, and means operating upon a reduction in brake pipe pressure for venting fluid from one side of said valve device to operate the same and thereby close said communication.

2. In a triple valve device, a piston subject to the opposing pressure of the auxiliary reservoir and brake pipe, valve means operated thereby for controlling a passage leading to the brake cylinder, a valve device normally subject to opposing fluid pressures for controlling communication through said passage, and means operating upon a sudden reduction in brake pipe pressure to vent fluid from one side of said valve device to the local brake pipe vent passage and thereby actuate said valve device to close communication through said brake cylinder passage.

3. In a fluid pressure brake, the combination with a triple valve and brake cylinder, of valve means adapted to control communication from said triple valve and from an additional source of fluid pressure to the brake cylinder, a movable abutment normally subject to opposing fluid pressure for operating said valve means and having differential heads, one of which is normally subject on one side to atmospheric pressure, and means operating upon a reduction in brake pipe pressure for varying the fluid pressure on one side of the other head to actuate said valve means and thereby cut off communication from the triple valve to the brake cylinder and supply air from said additional source to the brake cylinder.

4. A triple valve device provided with a passage through which air is supplied to and released from the brake cylinder, valve means for controlling communication through said passage, a movable abutment normally subject in one direction to atmospheric pressure and the pressure in the system and in the opposite direction to the pressure in the system, and means operating in an emergency application of the brakes for venting air from one side of said abutment to actuate the same and thereby close communication through said brake cylinder passage.

5. In a fluid pressure brake, the combination with an auxiliary reservoir, brake cylinder, and a supplemental reservoir, of a triple valve device provided with a passage through which air is supplied from the auxiliary reservoir to and released from the brake cylinder, valve means adapted to control communication through said passage and the supply of air from the supplemental reservoir to the brake cylinder, a movable abutment having differential heads, one normally subject in one direction to atmospheric pressure and the other on opposite sides to fluid at supplemental reservoir pressure, and means operating upon a sudden reduction in brake pipe pressure for venting air from one side of said movable abutment to cut off communication from the triple valve device through said passage and supply air from the supplemental reservoir to the brake cylinder.

6. In a fluid pressure brake, the combination with a triple valve, auxiliary reservoir, brake cylinder, and an additional source of fluid pressure, of valve means for controlling communication through a brake cylinder supply passage from said triple valve and from said additional source of fluid pressure, a movable abutment normally subject to opposing fluid pressures for actuating said valve means, and means operating upon a reduction in brake pipe pressure for venting air from one side of said abutment to a local brake pipe vent passage.

7. In a fluid pressure brake, the combination with a triple valve, auxiliary reservoir, brake cylinder, and an additional source of fluid pressure, of valve means for controlling communication through a brake cylinder supply passage from said triple valve and from said additional source of fluid pressure, and a movable abutment normally subject to opposing fluid pressures for actuating said valve means, said triple valve having ports for connecting the local brake pipe vent passage with a source of fluid pressure in one position and with one side of said abutment in emergency position.

8. In a fluid pressure brake, the combination with a piston subject to the opposing pressures of the auxiliary reservoir and brake pipe and main valve means operated thereby for controlling a passage leading to the brake cylinder, of means operating upon a sudden reduction in brake pipe pressure for opening a local brake pipe vent passage, a valve for controlling communication through said brake cylinder passage, a movable abutment normally subject to opposing fluid pressures for controlling said valve, said main valve means being adapted in the movement to emergency position to admit fluid from a source of fluid pressure to said local brake pipe vent passage and in emergency position to connect one side of said movable abutment to the local brake pipe vent passage.

9. In a fluid pressure brake, the combination with a piston subject to the opposing pressures of the auxiliary reservoir and brake pipe, main valve means operated thereby for controlling a passage leading to the brake cylinder, of means operating upon a sudden reduction in brake pipe pressure for opening a local brake pipe vent passage, a valve for controlling communication through said brake cylinder passage, a movable abutment normally subject to opposing fluid pressures for controlling said valve means, said main valve means being adapted in moving toward emergency position to first admit fluid to said local brake pipe vent passage and then connect same to one side of said movable abutment, and a spring stop having two springs for defining respectively the service application position and the position in which fluid is admitted to the local brake pipe vent passage.

10. In a fluid pressure brake, the combination with a triple valve device, brake cylinder, auxiliary reservoir, a safety valve for limiting the brake cylinder pressure in service applications, and an additional source of fluid pressure, of an emergency valve mechanism comprising valve means adapted to control communication from the brake cylinder through said safety valve and from the additional source of fluid pressure to the brake cylinder, a movable abutment having differential heads, one normally subject on one side to atmospheric pressure and the other to opposing fluid pressures, and means operating upon a reduction in brake pipe pressure for venting air from one side of said latter head to operate the valve means of said emergency valve mechanism and cut off communication from the brake cylinder through the safety valve and supply air from said additional source of fluid pressure to the brake cylinder.

11. In a fluid pressure brake, the combination with a train pipe and a source of fluid pressure, of a triple valve device operated by a reduction in train pipe pressure for supplying air to a chamber, a variation in pressure in which is adapted to effect an application of the brakes and a valve device operated by fluid pressure independently of spring pressure for controlling the supply of air from said source to said chamber to effect an emergency application of the brakes upon a sudden reduction in train pipe pressure.

12. In a triple valve device, the combination with a piston subject to train pipe pressure sure and valve means actuated by said piston upon a reduction in train pipe pressure for supplying air to effect an application of the brakes, of a passage through which air is vented from the train pipe upon a sudden reduction in train pipe pressure and a valve device operated by venting fluid from one side thereof to said passage for supplying fluid to effect an emergency application of the brakes.

13. In a fluid pressure brake, the combination with a train pipe, a source of fluid pressure, and a triple valve device having a piston movable to a position upon a gradual reduction in train pipe pressure to effect an application of the brakes and to an emergency position upon a sudden reduction in train pipe pressure to effect an application of the brakes at a higher degree of pressure by supplying fluid from said source, of means for preventing the admission of fluid from said source upon movement of said piston to emergency position under a gradual reduction in the train pipe pressure.

14. In a fluid pressure brake, the combination with a train pipe, a source of fluid pressure, a triple valve device having a piston subject to train pipe pressure, and valve means operated by said piston upon a gradual reduction in train pipe pressure for effecting an application of the brakes, of a valve device controlled and operated by the movement of said piston and valve means to emergency position under a sudden reduction in train pipe pressure for supplying fluid at a high degree of pressure from said source to effect an emergency application of the brakes and means for preventing the operation of said valve device upon movement of said piston and valve means to emergency position under a gradual reduction in train pipe pressure.

15. In a fluid pressure brake, the combination with a train pipe and a source of fluid under pressure, of a piston subject to train pipe pressure, the movement of which to one position under a gradual reduction in train pipe pressure effects a service application of the brakes and normally movable to another position under a sudden reduction in train pipe pressure to cause the supply of fluid from said source to effect an emergency application of the brakes and means for preventing the supply of fluid from said source upon movement of said piston to emergency position under a gradual reduction in train pipe pressure.

16. In a fluid pressure brake, the combination with a triple valve device having a passage through which air is locally vented from the train pipe upon a sudden reduction in train pipe pressure and provided with a piston and valve means operated by said piston for effecting an application of the brakes, of a valve device operated upon a sudden reduction in train pipe pressure by venting air from one side thereof to said train pipe vent passage for supplying air at a high degree of pressure to effect an application of the brakes and means operating upon movement of the triple valve to emergency position under gradual reductions in train pipe pressure to supply fluid to said vent passage and thereby prevent the operation of said valve device.

In testimony whereof I have hereunto set my hand.

WALTER V. TURNER.

Witnesses:
  WM. M. CADY,
  A. M. CLEMENTS.